S. N. Caldwell.
Hedge Fence.

N° 88,445.                    Patented Mar. 30, 1869.

Witnesses,
Cornelius Cox
Leopold Burt

Inventor
S. N. Caldwell
per Alexander Mason
Attys

S. N. CALDWELL, OF PILOT GROVE, INDIANA.

Letters Patent No. 88,445, dated March 30, 1869.

IMPROVEMENT IN HEDGE-FENCES.

The Schedule referred to in these Letters Patent and making part of the same.

*To all whom it may concern:*

Be it known that I, S. N. CALDWELL, of Pilot Grove, in the county of Newton, and in the State of Indiana, have invented certain new and useful Improvements in Culture of Hedge-Fences; and I do hereby declare that the following is a full, clear, and exact description thereof, reference being had to the accompanying drawings, and to the letters of reference marked thereon, making a part of this specification, in which—

Similar letters of reference indicate like parts.

My invention has for its object the formation of a hedge-fence, that will be more economically made, requiring little or no trimming, and the production of the same in a shorter space of time, than others heretofore known, and when done, makes a more complete fence.

In the annexed drawings—

Figure 1:
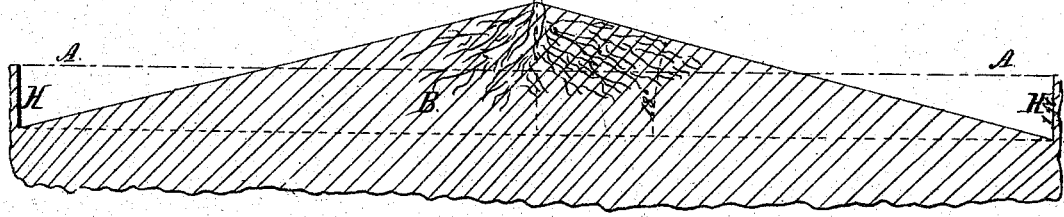
Figure 1 represents an end view of the earth around the hedge.

A, fig. 1, represents the surface of the earth, and

B, the elevation within which the young hedge is planted.

C represents a plant in a vertical position upon the apex of the thrown-up earth.

Prior to planting the sprouts, I prepare the earth, as follows:

I first cut the earth, as nearly as possible, in a perpendicular form, to the depth of about one foot, as seen at H, fig. 1, on each side of the line where the hedge-sprouts are to be planted. The two cuts thus made with a plow or otherwise, are about sixteen feet apart. I then throw the earth upward from these cuts, each way, to the centre, wherein the plants are to be placed, making the distance from the sprouts to each cut, about eight feet. The central line thus formed is elevated above the normal surface of the earth, so that the inclination from the apex to the base of the cut, on either side, is about eighteen degrees.

After thus making the bed, I place my sprouts in a row along the centre of the bed, in a vertical manner, and allow the sprouts to form roots and strength for two, three, or four years.

After the plant forms a bushy head, at the end of about the third year, I cut it entirely off, so that the sprouts near the top will, in about one year, grow thick and bushy from where the top was cut.

When the hedge has thus far grown, and has roots of sufficient strength, I bend them over in an inclined, or oblique manner, one after the other, so that they incline at an angle of about eighteen degrees, by cutting the lateral roots at right angles with the line of the hedge, and carrying over the plants with the earth about their roots.

Figure 2:
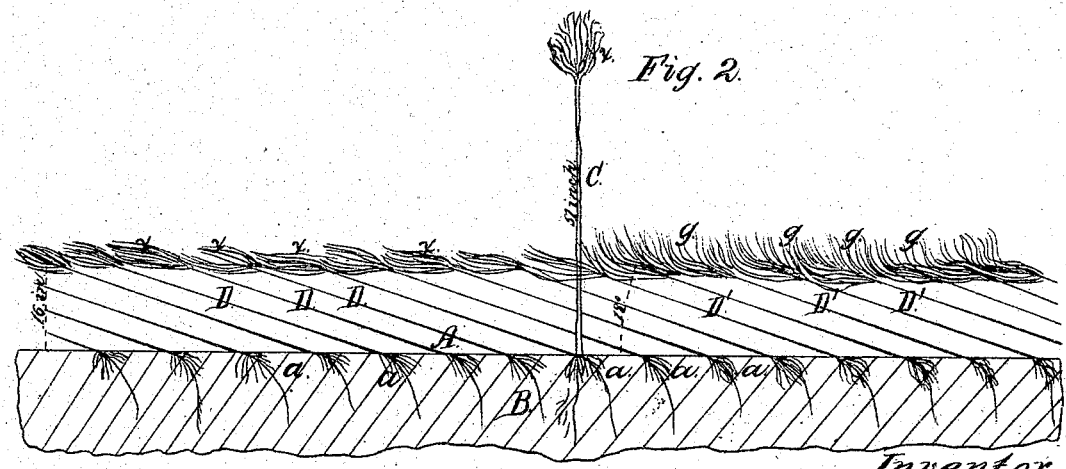
Figure 2 represents a side view, showing the mode of forming the hedge.

In fig. 2—

C represents a vertical hedge-plant, with its head, *x*, and roots, *a*, under the line of earth, A:

D D represent a series of the hedge-plants bent over as described; and

D' D' represent the same, after having been bent over for a short period, showing the vertical position the sprouts *g g*, around the head, will assume.

The construction of a hedge, by repeated plowing of the land, so that it may be filled in the centre, about one foot, more or less, and cutting down into the earth upon the outside, near a foot, and the space being one rod, or thereabout, in width, leaving the surface-grade at an angle of about eighteen degrees to the plane of the earth's surface, will cause the quick growth of the young plant, and increase its size.

The surface-soil is increased in quantity, and improved in quality, and, as a consequence, rapidly develops the growth of the sprout.

When the plant has attained three, four, or five years of age, the lateral roots, by this arrangement, being forced into the subsoil, which is not congenial to their growth, are checked in their development, thus dwarfing the plant when it has attained the age and size most desirable for a hedge-fence.

By thus cultivating the plant, the usual difficulties are obviated, and about one-half less ground is consumed in the fence.

The natural tendency of the sap is to flow directly up the plant, and form sprouts at the top, similar to the growth of a tree. By cutting the top of the plant off, as before stated, the number of stems, or sprouts is increased, and the head, or top of the plant, thereby dwarfed.

My great object is to preserve the flow of the sap to the upper part of the stock.

The usual mode of planting hedge-quicks, is to place them in the earth, in a position nearly horizontal, the tops being inclined a little upward, at a distance of near six inches, and when they have attained sufficient size, they are plashed, which is accomplished by cutting the plant partly off, near the ground, and bending it to the earth's surface, from which numerous sprouts will ascend. Those from below the cut having the advantage, soon overpower the others, and they are left to perish, making gaps in the hedge, while the leading sprout becomes a tree, and the purposes for which it was intended are lost.

In the plan which I propose, I produce but one stock from a single quick, and, by topping the head of this stock, produce a number of dwarfed heads, and by bending over the stock without cutting it, and fixing it at an angle of about eighteen degrees, the sap continues to flow to the natural head of the plant, developing a dwarfed tree.

By my mode, of first placing the plant in the earth vertically, and then bending it over, as described, I preserve the flow of the sap to the top, and have no sprouts from the side or trunk of the plant.

It is true that the sprouts about the head will grow vertically from the head, and a few throw off lateral branches, projecting downward. The bodies below the head will grow larger, and, in time, form an almost impenetrable mass.

Having thus fully described my invention,

What I claim as new, and desire to secure by Letters Patent, is—

1. Preparing the earth, by cutting down into the same on each side of the plant, and elevating the centre, between the cuts, at an angle of about eighteen degrees from the centre, each way, to the base of each cut, substantially as shown and described.

2. Planting the hedge-sprouts in the centre of earth formed as above, in a vertical manner, and cultivating the same to form a dwarfed head, substantially as set forth.

3. Bending over the hedge-plant and its roots, with the adhering earth, to an inclination of about eighteen degrees, after having attained sufficient grown therefor, preserving the flow of sap through the stock, and the continuous development of the dwarfed head, substantially as shown and described.

4. A hedge-fence formed by preparing the earth as specified, then planting the young sprouts in a vertical manner, and bending the same and its roots over, at an angle of about eighteen degrees, and growing the same in said position, substantially as set forth.

In testimony that I claim the foregoing, I have hereunto set my hand, this 11th day of March, 1869.

S. N. CALDWELL.

Witnesses:
 LEOPOLD EVERT,
 A. N. MARR.